US011445027B2

(12) United States Patent
Ponnuru et al.

(10) Patent No.: US 11,445,027 B2
(45) Date of Patent: Sep. 13, 2022

(54) SYSTEM AND METHOD FOR PLATFORM SESSION MANAGEMENT USING DEVICE INTEGRITY MEASUREMENTS

(71) Applicant: DELL PRODUCTS, LP, Round Rock, TX (US)

(72) Inventors: Viswanath Ponnuru, Bangalore (IN); Lee Eric Ballard, Georgetown, TX (US); Chandrasekhar Mugunda, Austin, TX (US); Rama Rao Bisa, Bangalore (IN); Chandrashekar Nelogal, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 12 days.

(21) Appl. No.: 17/068,407

(22) Filed: Oct. 12, 2020

(65) Prior Publication Data
US 2022/0116460 A1 Apr. 14, 2022

(51) Int. Cl.
*H04L 67/141* (2022.01)
*H04L 67/145* (2022.01)
(Continued)

(52) U.S. Cl.
CPC .............. *H04L 67/141* (2013.01); *G06F 8/65* (2013.01); *G06F 8/71* (2013.01); *H04L 9/3263* (2013.01); *H04L 67/145* (2013.01)

(58) Field of Classification Search
CPC ... H04L 67/141; H04L 67/145; H04L 9/3263; G06F 21/572; G06F 2221/033; G06F 8/65; G06F 8/71
See application file for complete search history.

(56) References Cited

U.S. PATENT DOCUMENTS

| 6,686,838 B1 * | 2/2004 | Rezvani .............. G06F 3/04842 340/506 |
| 10,318,550 B2 | 6/2019 | Narayanan et al. |

(Continued)

OTHER PUBLICATIONS

Katzenbeisser et al., "Secuirty in Autonomous Systems", 2019 IEEE European Test Symposium (ETS), May 27, 2019, IEEE Publishing.*

*Primary Examiner* — Todd L Barker
(74) *Attorney, Agent, or Firm* — Larson Newman, LLP

(57) ABSTRACT

A management controller sends a first firmware measurement request to verify integrity of a device. The first firmware measurement request is sent at initial power on of the device, and is sent subsequent to negotiating a secure session between the management controller and the device. The management controller verifies a first firmware measurement in a first firmware measurement response to the first firmware measurement request prior to storing the first firmware measurement, and sends a heartbeat request to the device to monitor for a device state change. The management controller may receive a heartbeat acknowledgement from the device in response to the heartbeat request, wherein the heartbeat acknowledgement includes an indication of the device state change. In response to the receipt of the heartbeat acknowledgment that includes the device state change, the management controller sends a second firmware measurement request to the device. The management controller may also verify a second firmware measurement included in a second firmware measurement response to the second firmware measurement request that includes a comparison of the first firmware measurement and the second firmware measurement; and apply a security policy to the device based on the device state change.

20 Claims, 3 Drawing Sheets

(51) Int. Cl.
  *G06F 8/65*      (2018.01)
  *G06F 8/71*      (2018.01)
  *H04L 9/32*      (2006.01)

(56) References Cited

U.S. PATENT DOCUMENTS

| | | | |
|---|---|---|---|
| 2011/0217966 A1* | 9/2011 | McDonald | H04W 12/06 |
| | | | 455/416 |
| 2012/0214137 A1* | 8/2012 | Goree | F41A 33/00 |
| | | | 434/19 |
| 2016/0330201 A1* | 11/2016 | Nguyen-Huu | H04L 9/0822 |
| 2018/0034633 A1* | 2/2018 | Gill | H04L 9/12 |
| 2018/0063238 A1* | 3/2018 | Zhang | G06F 11/1425 |
| 2019/0044823 A1* | 2/2019 | Soundararajan | H04L 12/66 |
| 2019/0149977 A1* | 5/2019 | Seenappa | H04L 41/0668 |
| | | | 370/331 |
| 2019/0253431 A1* | 8/2019 | Atanda | G06F 21/62 |
| 2020/0133912 A1 | 4/2020 | Gupta et al. | |
| 2020/0136901 A1 | 4/2020 | Ballard et al. | |
| 2020/0257518 A1* | 8/2020 | Liedtke | G06F 8/65 |
| 2021/0250189 A1* | 8/2021 | Ahn | G06F 11/08 |

* cited by examiner

SYSTEM AND METHOD FOR PLATFORM SESSION MANAGEMENT USING DEVICE INTEGRITY MEASUREMENTS

FIELD OF THE DISCLOSURE

The present disclosure generally relates to information handling systems, and more particularly relates to platform security session management using device integrity measurements.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus, information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

SUMMARY

A management controller sends a first firmware measurement request to verify integrity of a device. The first firmware measurement request is sent at initial power on of the device, and is sent subsequent to negotiating a secure session between the management controller and the device. The management controller verifies a first firmware measurement in a first firmware measurement response to the first firmware measurement request prior to storing the first firmware measurement, and sends a heartbeat request to the device to monitor for a device state change. The management controller may receive a heartbeat acknowledgement from the device in response to the heartbeat request, wherein the heartbeat acknowledgement includes an indication of the device state change. In response to the receipt of the heartbeat acknowledgment that includes the device state change, the management controller sends a second firmware measurement request to the device. The management controller may also verify a second firmware measurement included in a second firmware measurement response to the second firmware measurement request that includes a comparison of the first firmware measurement and the second firmware measurement; and apply a security policy to the device based on the device state change.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
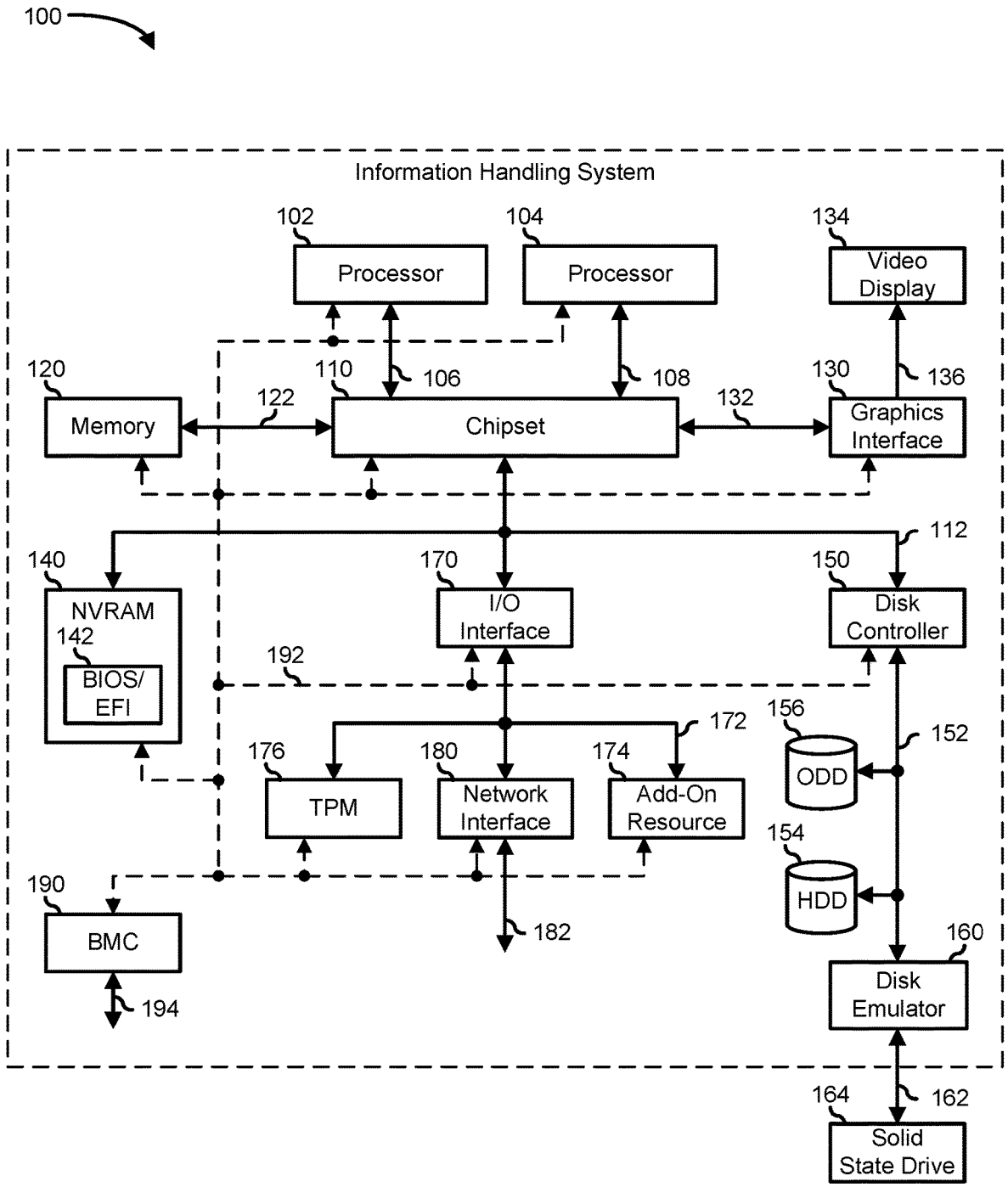
FIG. 1 is a block diagram illustrating an information handling system according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like.

Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four-lane (×4) PCIe adapter, an eight-lane (×8) PCIe adapter, a 16-lane (×16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit (I$^2$C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an institute of electrical and electronics engineers (IEEE) 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172, and network interface 180 translates information from a format suitable to the peripheral channel to a format suitable to external devices.

In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell® Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code.

BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WSMan) interface, a Management Component Transport Protocol (MCTP) or, a Redfish® interface), various vendor-defined interfaces (such as a Dell EMC Remote Access Controller Administrator (RACADM) utility, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100 or is integrated onto another element of the information handling system such as chipset 110, or another suitable element, as needed or desired. As such, BMC 190 can be part of an integrated circuit or a chipset within information handling system 100. An example of BMC 190 includes an iDRAC or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Information handling system 100 can include additional components and additional busses, not shown for clarity. For example, information handling system 100 can include multiple processor cores, audio devices, and the like. While a particular arrangement of bus technologies and interconnections is illustrated for the purpose of example, one of skill will appreciate that the techniques disclosed herein are applicable to other system architectures. Information handling system 100 can include multiple CPUs and redundant bus controllers. One or more components can be integrated together. Information handling system 100 can include additional buses and bus protocols, for example, I2C and the like. Additional components of information handling system 100 can include one or more storage devices that can store machine-executable code, one or more communications ports for communicating with external devices, and various input and output (I/O) devices, such as a keyboard, a mouse, and a video display.

For purpose of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smartphone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as processor 102, a programmable logic array (PLA), an embedded device such as a System-on-a-Chip (SoC), or other control logic hardware. Information handling system 100 can also include one or more computer-readable media for storing machine-executable code, such as software or data.

The DMTF secure protocol data model (SPDM) describes secure communications with managed devices, also referred to as endpoints, using certificate-based authentication. The endpoint is a logical entity that communicates with other endpoints over one or more transport protocols. The certificate-based authentication is used to verify hardware identities and/or the integrity of an endpoint based on a firmware measurement. Firmware measurement is a process of calculating the cryptographic hash value of firmware, software, or configuration data of the endpoint at a given point in time. This mechanism allows an authentication initiator or requestor to establish a secure session using key exchange protocols and the identity and measurement of the firmware, software, or configuration data on the endpoint.

However, the SPDM does not address scenarios when there is a change in the firmware measurement that breaks the integrity of the managed device. This change includes one or more of the following: a) a change to the managed device state due to a firmware update at runtime; b) a change in the hardware of the managed device at runtime; c) a change in the configuration of the managed device, and d) change in a digital certificate or certificate chain associated with the managed device. However, the SPDM does not re-negotiate a secure session and continues to operate using the session even if the integrity of the managed device is broken which is a security flaw. Thus, a system and method for re-negotiation of the secure session at runtime based on the change in the managed device that affects the firmware measurement which breaks the integrity of the managed device is desirable. The present disclosure addresses this issue by providing a system and method for notifying the management controller when there is a change to the state of the managed device that affects its firmware measurement.

Figure 2:
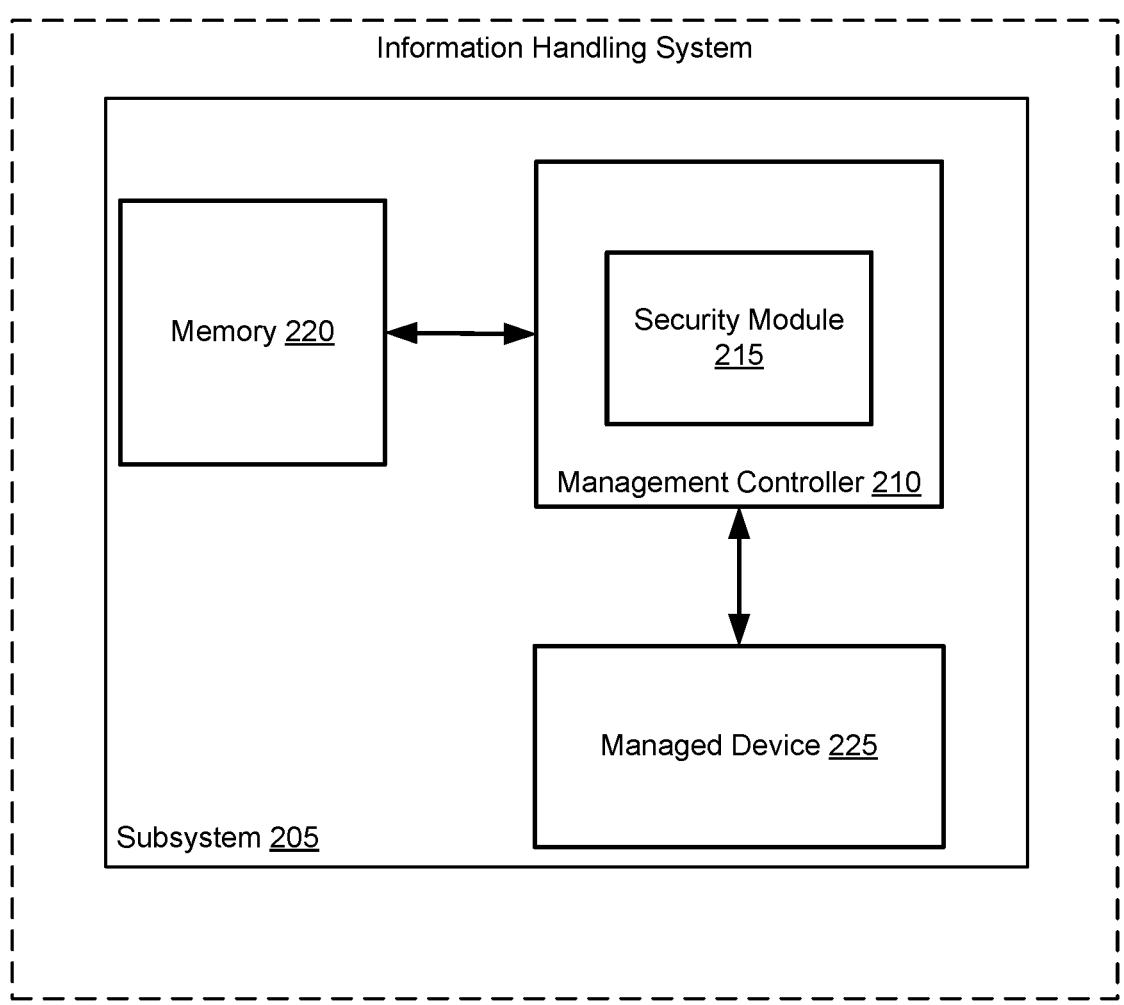
FIG. 2 is a block diagram illustrating an example system for platform security session management using device integrity measurements, according to an embodiment of the present disclosure.

FIG. 2 shows an information handling system 200 for performing platform security session management using device integrity measurements. Information handling system 200 is similar to information handling system 100 of FIG. 1 and includes a subsystem 205 which is a part of a platform management subsystem that provides the ability to monitor and report on the health of information handling system 200. In particular, subsystem 205 provides a system for security session re-negotiation capabilities based on the firmware measurement and device integrity changes. Subsystem 205 includes a management controller 210, a memory 220, and a managed device 225. Management controller 210 may include a security module 215.

Management controller 210, which is similar to BMC 190 of FIG. 1, may be configured to manage and/or monitor managed device 225 which includes verifying a firmware measurement of managed device 225. In addition, management controller 210 may be configured to re-negotiate a secure session between management controller 210 and managed device 225. The re-negotiation may be based on a firmware measurement and/or a change in the device integrity of managed device 225. The firmware measurement is a representation of firmware/software or configuration data of managed device 225. The firmware measurement is typically a cryptographic hash value of the representation data, or the raw data itself.

Managed device 225 may include platform management components intercommunication PMCI components that support SPDM specification. In addition, managed device 225 may be configured to optionally bind the firmware measurement with its identity through the use of digital signatures. The binding enables management controller 210 to establish the identity and the measurement of the firmware/software or configuration running on managed device 225. Management controller 210 may authenticate a digital certificate or certificate chain of managed device 225 using a public key. The public key is associated with a private key that was used to generate and/or sign the digital certificate.

Managed device 225 may be communicatively coupled with management controller 210 to establish a secure session between managed device 225 and management controller 210. The secure session may be a secure communication channel with cryptographic information that is bound transiently between a requestor and a responder. The secure session provides either or both of encryption or message authentication for communicating data. The data may be communicated via a response/request mechanism between management controller 210 and managed device 225 over the secure session.

Management controller 210 may be configured to manage and enforce one or more security policies stored at memory 220. The security policies may define platform security session management using device integrity measurements of managed devices such as managed device 225. A security policy may include a set of rules that have been grouped and applied when a change in the device integrity of managed device 225 occurs, such as a change in the firmware measurement and/or a change in the digital certificate during the secure session, is detected during a secure session. Examples of security policies may include the following:

a) If a managed device is set at an "Administrative Lockdown" mode, then the management controller terminates the secure session and puts the secure session in a "Quarantine" state.

b) If the managed device is set at an "Administrative Non-Lockdown" mode, then the management controller tears the existing secure session and re-negotiates a new secure session. The managed controller may also verify the authenticity of the managed device.

Figure 3:
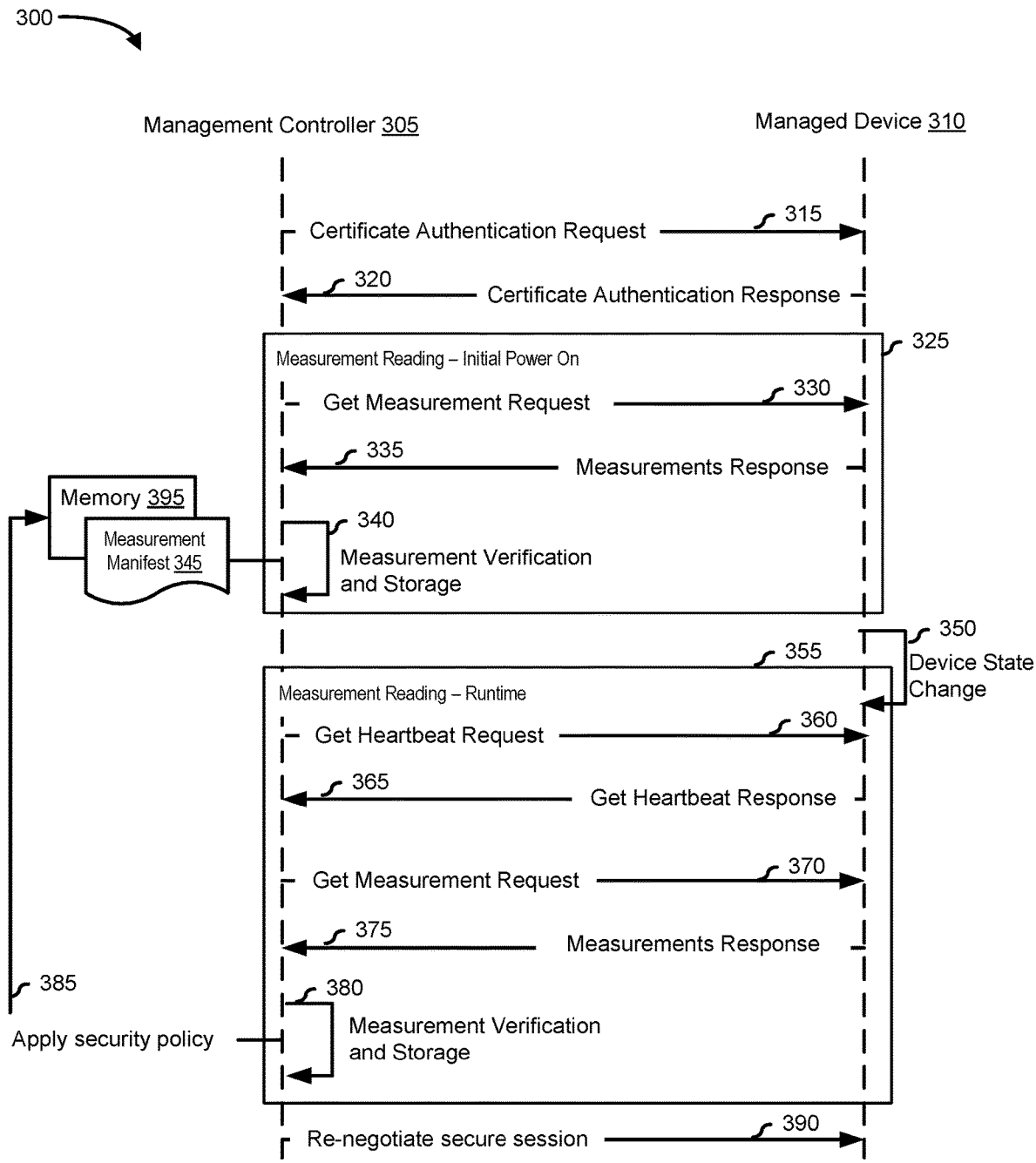
FIG. 3 is a flowchart illustrating an example method for platform security session management using device integrity measurements, according to an embodiment of the present disclosure.

FIG. 3 illustrates a method 300 for a secure session re-negotiation capabilities based on the state of the managed device. Method 300 allows management controller 305 to manage or monitor the secure session associated with managed device 310. This includes verifying the integrity of the managed device at runtime and allowing the management controller to enforce a security policy which protects the secure session dynamically. Protection of the secure session includes protection from the state change of the managed device in real-time. The present disclosure defines messages, data objects, and sequences of message exchanges between management controller 305 and managed device 310.

Method 300 includes a proposed update to the SPDM specification. Method 300 includes a definition and sequences of message exchanges and data objects for monitoring and managing a device such as a device state change during the secure session. While embodiments of the present disclosure are described in terms of information handling system 200 of FIG. 2, it should be recognized that other systems may be utilized to perform the described method.

Method 300 shows message exchanges between management controller 305 and managed device 310 through sending and receiving messages such as SPDM messages. Here, management controller 305, acting as a requestor may send a request to managed device 310 to perform an operation. Managed device 310, acting as a responder, may send a response to the request after performing the operating. The response may include a response code field to indicate whether the request is completed normally.

At step 315, management controller 305 may send an identification authentication request also referred to as a certificate authentication request to managed device 310. At step 320, managed device 310 sends a response to the identity authentication request of management controller 305. The identity authentication response may include a certificate chain to be used in authenticating managed device 310. Managed device 310 may have a certificate chain that includes a device-specific certificate and a self-signed root certificate. Managed device 310 may also have a public-private key pair for authenticating its hardware identity. The certificate chain may be encrypted using the private key before transmitting the identity response to management controller 305. Management controller 305 may authenticate managed device 310 based on a certificate chain and/or a public key associated with managed device 310. The public key may be used to decrypt the certificate chain. In another embodiment, step 315 and step 320 may be used to establish session keys that are known to management controller 305 and managed device 310. After a successful authentication, a secure session between management controller 305 and managed device 310 is established. The secure session is a session that provides encryption and/or message authentication for communicating data between management controller 305 and managed device 310.

The secure session may be used to get a firmware measurement at the initial power-on of managed device 310 at block 325. The firmware measurement at the initial power-on of managed device 310 may be referred to as an initial measurement. Block 325 includes step 330, step 335, and step 340. At step 330, management controller 305 sends a "get measurements" request to managed device 310. For example, management controller 305 may send an SPDM "GET_MEASUREMENTS" request message. The get measurement request may be used to retrieve the firmware measurement of managed device 310. The measurement may describe the process of calculating the cryptographic hash value of firmware or software that is associated with the hardware identity of a managed device using the digital signature of the managed device. The cryptographic hash value may also be referred to as a firmware measurement of the managed device. At step 335, managed device 310 sends a response to the get measurement request. For example, managed device 310 may send an SPDM "MEASUREMENTS" response message. The get measurement response may include a measurement block that includes the firmware measurement of managed device 310.

At step 340, management controller 305 may verify the firmware measurement received from managed device 310 using the public key. After a successful verification, management controller 305 may store and maintain the firmware measurement in a measurement manifest 345 at memory 395. Memory 395 may be a non-volatile memory that is accessible by management controller 305. A structure of the measurement manifest with sample details is shown in table 1 below.

TABLE 1

Measurement manifest structure

| Device Identifier | Session Identifier | Measurement Hash | Secure Device State |
|---|---|---|---|
| 0xABC | 2918192 | 90aheri14123 | 0 |

The device identifier field uniquely identifies managed device 310. The session identifier field uniquely identifies the secure session. The measurement hash field includes the cryptographic hash value. The measurement hash may be derived based on a cryptographic algorithm such as a secure hash algorithm (SHA) which includes SHA2-256, SHA2-384, SHA2-512, etc. The secure device state field includes a bitmask listing supported device states such as the following: Bit 0—Trusted, Bit 1—Untrusted, Bit 2—Maintenance, Bit 3—Quarantine. At step 350, managed device 310 has a device state change. For example, a firmware of managed device 310 has been updated, a configuration of managed device 310 has been changed, a hardware component of managed device 310 has been changed, the certificate chain associated with managed device 310 has been updated or changed, etc.

A runtime firmware measurement reading occurs at block 355. Block 355 includes step 360, step 365, step 370, step 375, and step 380. At step 360, management controller 305 sends a get heartbeat request to managed device 310. For example, management controller 305 sends an SPDM HEARTBEAT request message to managed device 310. The heartbeat request function may be used to monitor the health of the secure session associated with managed device 310 and is periodically sent to managed device 310 at various intervals, such as every milliseconds, seconds, etc. as indicated in a heartbeat period parameter. The heartbeat request may also be used to monitor the device state of managed device 310.

In response to the heartbeat request at step 360, managed device 310 sends a heartbeat response to management controller 305 at step 365. For example, managed device 310 sends an SPDM HEARTBEAT_ACK response message. The heartbeat response includes a notification of the device state change. Table 2 below shows a proposed HEARTBEAT_ACK response message format that includes a field "changeNotification" indicating the managed device state change during the secure session.

TABLE 2

Heartbeat response message structure

| Offsets | Field | Size in bytes | Value |
|---|---|---|---|
| 0 | SPDMVersion | 1 | V1.1 = 0x11 |
| 1 | RequestResponseCode | 1 | 0x68 = HEARTBEAT_ACK Response |
| 2 | Param1 | 1 | Reserved |
| 3 | Param2 | 1 | Reserved |
| 4 | ChangeNotification | 1 | Bit-0: Firmware Measurement Change Bit-1: Firmware Certificate Change All other values reserved |

The changeNotification field indicates the state changes that are specific to the request-response code. Managed device 310 will set the value of bit-0 to one indicating the firmware measurement has changed from the last time the heartbeat response was provided. This bit will be set to 01h after the change in the firmware in one or more components of managed device 310. This bit will be set until the next MEASUREMENTS response message is sent. Or until the next reset of the managed device. A value 00h at bit-0 represents no state change.

Managed device 310 may set the value of bit-1 to one to indicate that the device's certificate has changed from the last time the heartbeat response was provided. The value shall be set after a change in the certificate and will be set until the next CERTIFICATE response message is sent by managed device 310, or until the next reset of managed device 310. A value zero at bit-1 represents no state change.

After receiving the heartbeat response message, management controller 305 sends a get measurement request to managed device 310 at step 370. For example, management controller 305 may send an SPDM "GET_MEASUREMENTS" request message. The get measurements request may be used to retrieve the current firmware measurement of managed device 310. Management controller 305 may send a get measurement request based on the changeNotification field. For example, management controller 305 may send a get measurement parameter if managed device 310 has a state change, as indicated by bit-0 or bit-1 of changeNotification field. At step 375, managed device 310 sends a "measurements response" to management controller 305. For example, managed device 310 may send an SPDM "MEASUREMENTS" response message. The get measurement response may include a measurement block that includes the current firmware measurement of managed device 310.

At step 380, management controller 305 may verify the response and/or firmware measurement included in the response. Management controller 305 may verify the firmware measurement by comparing it with the firmware measurement with the initial measurement manifest such as measurement manifest 345. After the verification, management controller 305 may store the current firmware measurement in another measurement manifest file at memory 395. The initial measurement manifest may be mapped to the current measurement manifest before storage at memory 395.

At step 385, management controller 305 may apply one or more security policies to managed device 310 based on the current measurement and/or the configuration setting of managed device 310. The security policies may be defined during manufacture and/or by administrator at setup. At step 390, management controller 305 may re-negotiate the secure session based on the device stage change and one or more security policies.

Although FIG. 3 shows example blocks or steps of method 300 in some implementation, method 300 may include additional blocks/steps, fewer blocks/steps, different blocks/steps, or differently arranged blocks/steps than those depicted in FIG. 3. Additionally, or alternatively, two or more of the blocks/steps of method 300 may be performed in parallel. For example, step 380 and step 385 of method 300 may be performed in parallel.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method comprising:
sending, by a management controller, a first firmware measurement request to a device to verify integrity of the device, wherein the first firmware measurement request is sent at initial power on of the device, wherein the sending the first firmware measurement request is subsequent to negotiating a secure session between the management controller and the device, and wherein the management controller and the device are components of a platform system;
verifying a first firmware measurement included in a first firmware measurement response to the first firmware measurement request prior to storing the first firmware measurement in a measurement manifest;
monitoring the device to detect a device state change by periodically sending a heartbeat request to the device;
receiving a heartbeat acknowledgement from the device in response to the heartbeat request, wherein the heartbeat acknowledgement includes an indication of the device state change during the secure session between the management controller and the device;
in response to the receiving the heartbeat acknowledgment that include the indication of the device state change, sending a second firmware measurement request to the device;
verifying a second firmware measurement included in a second firmware measurement response to the second firmware measurement request, wherein the verifying includes comparing the second firmware measurement with the first firmware measurement according to the measurement manifest; and
applying a security policy to the device based on the device state change.

2. The method of claim 1, further comprising subseuqent to indication of the device state change, re-negotiating the secure session between the management controller and the device.

3. The method of claim 1, wherein the indication of the device state change includes a change in the first firmware measurement of the device.

4. The method of claim 1, wherein the indication of the device state change includes a change in a firmware certificate of the device.

5. The method of claim 1, wherein the indication of the device state change includes a bit zero that is set to a value of one from an initial value of zero to indicate a change in the first firmware measurement of the device.

6. The method of claim 1, wherein the indication of the device state change includes a bit one that is set to a value of one from an initial value of zero to indicate a change in a firmware certificate of the device.

7. The method of claim 1, wherein the verifying the second firmware measurement includes decrypting the second firmware measurement using a public key associated with the device.

8. The method of claim 1, further comprising terminating the secure session and marking the secure session for quarantine if the device is in an administrative lockdown mode.

9. The method of claim 1, further comprising re-negotiating the secure session if the device is in an administrative non-lockdown mode.

10. An information handling system, comprising:
a device managed by a management controller; and
the management controller configured to communicate with the device, and to:
send a first firmware measurement request to the device to verify integrity of the device, wherein the first firmware measurement request is sent at initial power on of the device, wherein the first firmware measurement request is sent subsequent to negotiating a secure session between the management controller and the device and wherein the management controller and the device are components of a platform system;
verify a first firmware measurement in a first firmware measurement response to the first firmware measurement request prior to storing the first firmware measurement in a measurement manifest;
send a heartbeat request to the device to monitor for a device state change;
receive a heartbeat acknowledgement from the device in response to the heartbeat request, wherein the heartbeat acknowledgement includes an indication of the device state change;
in response to the receipt of the heartbeat acknowledgment that includes the device state change, sending a second firmware measurement request to the device during the secure session between the management controller and the device;
verify a second firmware measurement included in a second firmware measurement response to the second firmware measurement request that includes a comparison of the first firmware measurement and the second firmware measurement according to the measurement manifest; and
apply a security policy to the device based on the device state change.

11. The information handling system of claim 10, wherein the management controller is further configured to re-negotiate the secure session between the management controller and the device.

12. The information handling system of claim 10, wherein the heartbeat acknowledgment response includes a field associated with a change in the first firmware measurement of the device.

13. The information handling system of claim 10, wherein the heartbeat acknowledgement response includes a field associated with a change in a firmware certificate of the device.

14. The information handling system of claim 10, wherein the management controller is further configured to re-negotiate the secure session if the management controller is in administrative non-lockdown mode.

15. The information handling system of claim 10, wherein the management controller is further configured terminate the secure session and puts the secure session in quarantine.

16. A non-transitory computer-readable medium including code that when executed performs a method, the method comprising:
sending a first firmware measurement request to a device to verify integrity of the device, wherein the first firmware measurement request is sent to the device at initial power on of the device, and wherein the sending the first firmware measurement request is subsequent to negotiating a secure session between a management controller and the device, wherein the management controller and the device are components of a platform subsystem;
verifying a first firmware measurement included in a first firmware measurement response to the first firmware measurement request prior to storing the first firmware measurement in a measurement manifest;
monitoring the device to detect a device state change by sending a heartbeat request to the device periodically;
receiving a heartbeat acknowledgement response from the device in response to the heartbeat request, wherein the heartbeat acknowledgement response includes an indication of the device state change during the secure session between the management controller and the device;
in response to the receiving the heartbeat acknowledgment response that include the indication of the device state change, sending a second firmware measurement request to the device;
verifying a second firmware measurement included in a second firmware measurement response to the second firmware measurement request, wherein the verifying includes comparing the second firmware measurement with the first firmware measurement according to the measurement manifest; and
applying a security policy to the device based on the device state change.

17. The method of claim 16, further comprising re-negotiating the secure session if the device is in an administrative non-lockdown mode.

18. The method of claim 16, further comprising terminating the secure session and marking the secure session for quarantine if the device is in an administrative lockdown mode.

19. The method of claim 16, wherein the indication of the device state change includes a change in a firmware certificate of the device.

20. The method of claim 16, wherein the indication of the device state change includes a change in the first firmware measurement of the device.

* * * * *